(12) United States Patent
Stephens et al.

(10) Patent No.: US 10,558,566 B2
(45) Date of Patent: Feb. 11, 2020

(54) GARBAGE COLLECTION OF NON-PINNED OBJECTS WITHIN HEAP

(71) Applicant: Microsoft Technology Licensing, LLC, Redmond, WA (US)

(72) Inventors: Maoni Zhang Stephens, Kirkland, WA (US); Patrick Henri Dussud, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 739 days.

(21) Appl. No.: 14/688,814

(22) Filed: Apr. 16, 2015

(65) Prior Publication Data

US 2016/0306739 A1 Oct. 20, 2016

(51) Int. Cl.
*G06F 12/02* (2006.01)

(52) U.S. Cl.
CPC .................. *G06F 12/0269* (2013.01)

(58) Field of Classification Search
CPC . G06F 12/0269; G06F 12/023; G06F 12/0253
USPC .......................................................... 707/816
See application file for complete search history.

(56) References Cited

U.S. PATENT DOCUMENTS

| | | | | |
|---|---|---|---|---|
| 5,560,003 | A * | 9/1996 | Nilsen | G06F 12/0253 |
| 6,421,689 | B1 * | 7/2002 | Benson | G06F 12/0253 |
| 6,434,575 | B1 * | 8/2002 | Berry | G06F 12/0253 |
| 6,898,611 | B1 | 5/2005 | Dussud et al. | |
| 6,922,765 | B2 | 7/2005 | Jacobs | |
| 6,999,980 | B2 | 2/2006 | Detlefs et al. | |
| 7,010,555 | B2 | 3/2006 | Blandy et al. | |
| 7,107,426 | B2 | 9/2006 | Kolodner et al. | |
| 7,584,232 | B2 | 9/2009 | Guo | |
| 8,769,229 | B2 | 7/2014 | Paperin et al. | |
| 8,799,615 | B2 | 8/2014 | Maram et al. | |
| 2003/0005027 | A1 * | 1/2003 | Borman | G06F 9/445 718/104 |
| 2003/0033344 | A1 * | 2/2003 | Abbott | G06F 9/4435 718/1 |
| 2010/0042799 | A1 | 2/2010 | Printezis | |

(Continued)

OTHER PUBLICATIONS

Sivakumar, Nish, "C++/CLI in Action—Using Interior and Pinning Pointers", Published on: Feb. 28, 2007 Available at: http://www.codeproject.com/Articles/17817/C-CLI-in-Action-Using-interior-and-pinning-pointer.

(Continued)

*Primary Examiner* — Tony Mahmoudi
*Assistant Examiner* — Michael Le
(74) *Attorney, Agent, or Firm* — Workman Nydegger

(57) ABSTRACT

Garbage collection of objects within the heap of a computing system, and movement of adjacent sets of live objects as a whole in order to perform compaction. The compaction may be performed even if there are adjacent sets of live objects that include one or more pinned objects that should not be moved by the garbage collector. The garbage collector uses gaps to include relocation information with respect to sets of adjacent objects of the same pinned status. Some gaps may be formulated by writing over the live objects themselves, in which case that written over data is saved off prior to formulating the gap. When compaction is performed, the saved off data is used to fully integrate the adjacent objects of the same pinned status in the process of compaction.

22 Claims, 12 Drawing Sheets

(56) References Cited

U.S. PATENT DOCUMENTS

| | | | |
|---|---|---|---|
| 2011/0302183 A1* | 12/2011 | Van De Vanter | G06F 9/44 707/758 |
| 2014/0047209 A1* | 2/2014 | Pizlo | G06F 8/443 711/173 |
| 2014/0047423 A1 | 2/2014 | Pizlo et al. | |

OTHER PUBLICATIONS

"Generational GC", Published on: Oct. 2, 2014 Available at: http://www.mono-project.com/docs/advanced/garbage-collector/sgen/#garbage-collection.

Blackburn, et al., "Immix: A Mark-Region Garbage Collector with Space Efficiency, Fast Collection, and Mutator Performance", In Proceedings of ACM SIGPLAN Conference on Programming Language Design and Implementation, Jun. 7, 2008, 11 pages.

Branbray, "Some Notes about Mixed Types", Published on: Jul. 20, 2005 Available at: http://blogs.msdn.com/b/branbray/archive/2005/07/20/441099.aspx

* cited by examiner

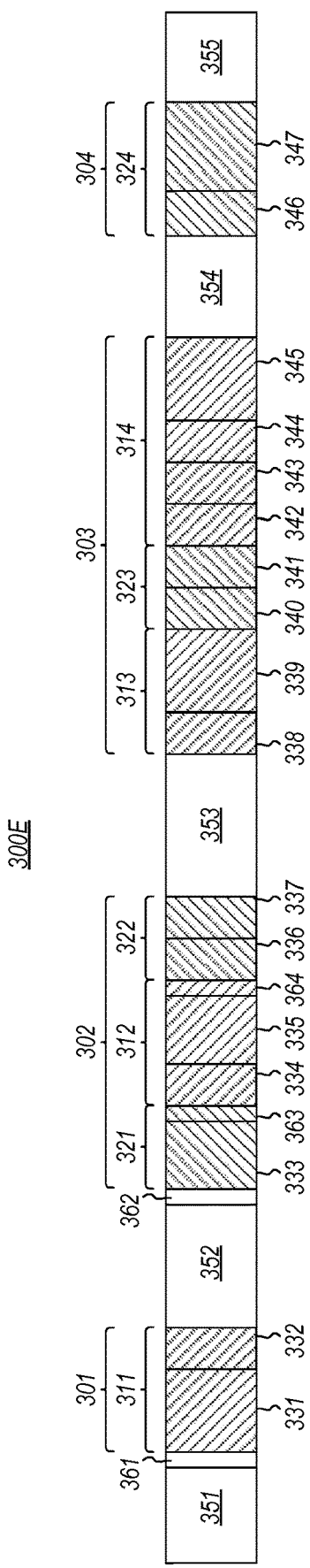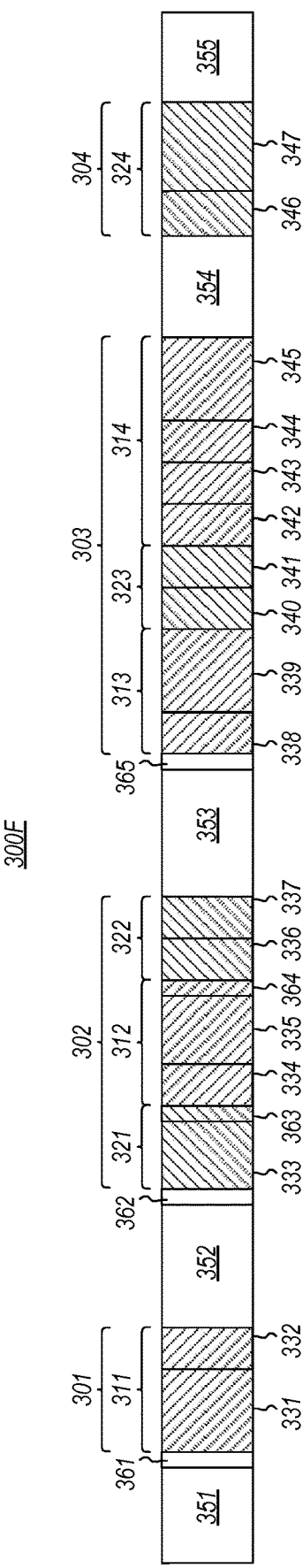

GARBAGE COLLECTION OF NON-PINNED OBJECTS WITHIN HEAP

BACKGROUND

Computing systems and associated networks have revolutionized the way human beings work, play, and communicate. Computing systems rely on software for direction on how to operate. As applications run, they may create objects on a portion of system memory called the "heap". However, for one reason or another, objects may outlive their utility on the heap. This may occur, for instance, if the application that created the object in the heap fails to release the object from the heap prior to closing. This may occur due to a coding oversight in the application, or due to a disorderly shutdown of the application.

Of course, the size of the heap is finite. Accordingly, to increase the odds that objects in the heap are being useful to one or more processes operating on the computing system, a component called a "garbage collector" scans the heap periodically to identify those objects that are being used (called "live objects"), and objects that are no longer being used (called "dead objects"). The garbage collector may remove the dead objects by considering the space they occupy as available for writing over.

Another operation of the garbage collector is to compact the objects so that there are larger portions of empty space available for placing objects yet to be created, and such that already created objects have a higher degree of adjacency. Such improves the performance of the computing system as a whole. Thus, garbage collectors determine which objects are live objects, and move those live objects around so as to make better usage of the heap. For any object that is moved, the garbage collector may also update the pointers for any objects that refer to that moved object, so as to properly refer to the new location of the moved object. The garbage collector may update the pointers either directly or with the aid of other components, such as a managed code environment.

Some objects, however, cannot be moved because there is no effective way to update the pointers of objects that reference the object. Accordingly, those objects may be pinned at that location in the heap, thus negating the need to update any pointers to that object. However, the number of pinned objects that cannot be moved by the garbage collector tends to be rather small compared to the number of unpinned objects that can be moved. Thus, garbage collectors conventionally just work around the few pinned objects when moving unpinned objects within the heap.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to garbage collection of objects within the heap of a computing system, and movement of adjacent sets of live objects as a whole in order to perform compaction. Furthermore, the compaction may be performed even if there are adjacent sets of live objects that include one or more pinned objects that should not be moved by the garbage collector.

In one embodiment, the garbage collector performs the normal duty of distinguishing objects (called "live objects") that are likely being used by active processes running on the computing system, and objects (called "dead" objects) that are likely not being used by active processes running on the computing system. The garbage collector may then treat the space occupied by dead objects as empty space and available for placement of other data, such as live objects.

The garbage collector prepares to perform compaction by identifying adjacent sets of live objects that are separated by gaps of empty space. In one embodiment, the space just prior to the adjacent set of live objects may be used to detail compaction information regarding that adjacent set of objects. For instance, such may be the case if all of the live objects within the corresponding adjacent set of live objects are all unpinned objects (and thus movable by the garbage collector).

However, in accordance with the principles described herein, the garbage collector may also perform compaction for adjacent sets of live objects that contain a mix of pinned objects and unpinned objects, rather than in that case treating all of that adjacent set of live objects as pinned. In such a case, to prepare for compaction, the garbage collector finds a boundary between one or more adjacent pinned objects and one or more adjacent non-pinned objects within the adjacent set of live objects. The garbage collector then identifies a designated location for formulating a gap with respect to the found boundary. The garbage collector then saves information that would be overwritten at the designated location due to the anticipated formulation of the gap. For instance, if the designated location were just prior to or just after the boundary, then writing to that designated location would result in overwriting of at least a portion of a live object. Accordingly, only after saving the information, the gap is then formatted so as to be recognized by the garbage collector at the designated location. Data is also written to the gap, which data is interpretable by the garbage collector as relocation information with respect to either the one or more adjacent pinned objects or the one or more adjacent non-pinned objects.

In some embodiments, in a subsequent stage, the garbage collector may update pointers of objects that it anticipates moving. If saved data from the designated location happens to include all or some of a pointer, then the saved data may also be updated accordingly so that the new pointer is preserved, while allowing the formulated gap to occupy the space of the live object.

During the next compaction phase, the garbage collector makes proper accounting for this saved data that was saved to prevent overwriting of a live object due to formulation of the gap. In particular, the garbage collector scans through the heap to find recognized gaps that will include relocation information. When the garbage collector finds a recognizable gap, the garbage collector reads the information to determine where the subsequent set of objects is to be moved to within the heap. Prior to compacting, however, the garbage collector continues to move through the heap within that subsequent set of objects to see if there are any gaps created within that subsequent set of objects that necessitated saving of a portion of the subsequent set of objects. If so, that saved data is retrieved, and the fully integral subsequent set of live objects may then be moved within the heap. This process continues for each found gap.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 3A through 3I illustrate various states of a heap that is processed through a compaction preparation stage following the method of FIG. 4;

DETAILED DESCRIPTION

Figure 1:
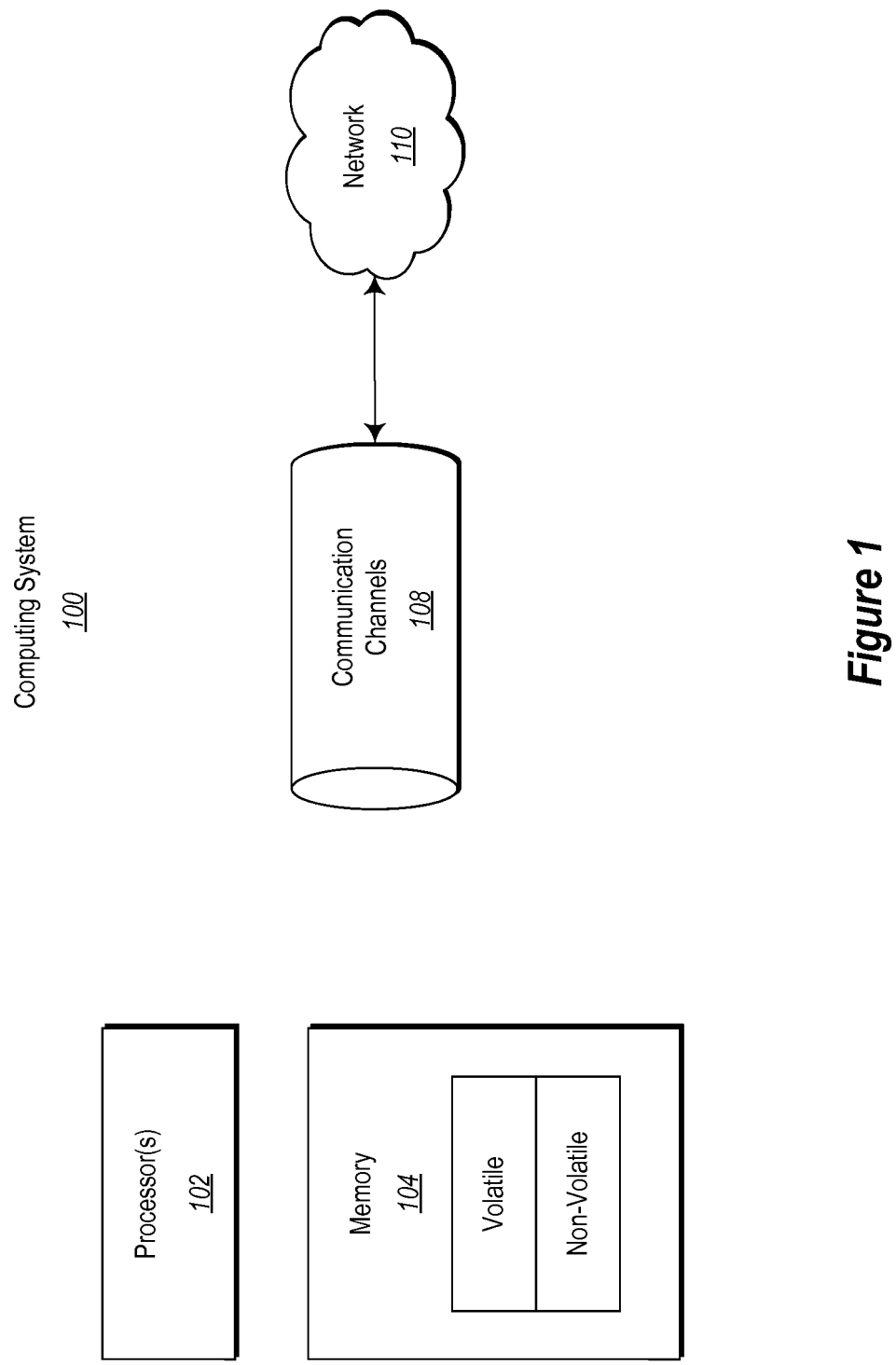
FIG. 1 abstractly illustrates a computing system in which some embodiments described herein may be employed.

At least some embodiments described herein relate to garbage collection of objects within the heap of a computing system, and movement of adjacent sets of live objects as a whole in order to perform compaction. Furthermore, the compaction may be performed even if there are adjacent sets of live objects that include one or more pinned objects that should not be moved by the garbage collector.

In one embodiment, the garbage collector performs the normal duty of distinguishing objects (called "live objects") that are likely being used by active processes running on the computing system, and objects (called "dead" objects) that are not being used by active processes running on the computing system. The garbage collector may then treat the space occupied by dead objects as empty space and available for placement of other data, such as live objects.

The garbage collector prepares to perform compaction by identifying adjacent sets of live objects that are separated by gaps of empty space. In one embodiment, the space just prior to the adjacent set of live objects may be used to detail compaction information regarding that adjacent set of objects. For instance, such may be the case if all of the live objects within the corresponding adjacent set of live objects are all unpinned objects (and thus movable by the garbage collector).

However, in accordance with the principles described herein, the garbage collector may also perform compaction for adjacent sets of live objects that contain a mix of pinned objects and unpinned objects, rather than in that case treating all of that adjacent set of live objects as pinned. In such a case, to prepare for compaction, the garbage collector finds a boundary between one or more adjacent pinned objects and one or more adjacent non-pinned objects within the adjacent set of live objects. The garbage collector then identifies a designated location for formulating a gap with respect to the found boundary. The garbage collector then saves information that would be overwritten at the designated location due to the anticipated formulation of the gap. For instance, if the designated location were just prior to or just after the boundary, then writing to that designated location would result in overwriting of at least a portion of a live object. Accordingly, only after saving the information, the gap is then formatted so as to be recognized by the garbage collector at the designated location. Data is also written to the gap, which data is interpretable by the garbage collector as relocation information with respect to either the one or more adjacent pinned objects or the one or more adjacent non-pinned objects.

In some embodiments, in a subsequent stage, the garbage collector may update pointers of objects that it anticipates moving. If saved data from the designated location happens to include all or some of a pointer, then the saved data may also be updated accordingly so that the new pointer is preserved, while allowing the formulated gap to occupy the space of the live object.

During the next compaction phase, the garbage collector makes proper accounting for this saved data that was saved to prevent overwriting of a live object due to formulation of the gap. In particular, the garbage collector scans through the heap to find recognized gaps that will include relocation information. When the garbage collector finds a recognizable gap, the garbage collector reads the information to determine where the subsequent set of objects is to be moved to within the heap. Prior to compacting, however, the garbage collector continues to move through the heap within that subsequent set of objects to see if there are any gaps created within that subsequent set of objects that necessitated saving of a portion of the subsequent set of objects. If so, that saved data is retrieved, and the fully integral subsequent set of live objects may then be moved within the heap. This process continues for each found gap.

Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

The principles described herein relate to the garbage collection of a heap. A heap is an area of system memory that is used to keep objects at runtime of a computing system. For instance, with reference to FIG. 1, the heap may be allocated from the memory 104, and may include objects that are being used during the runtime of the computing system 100.

Figure 2:
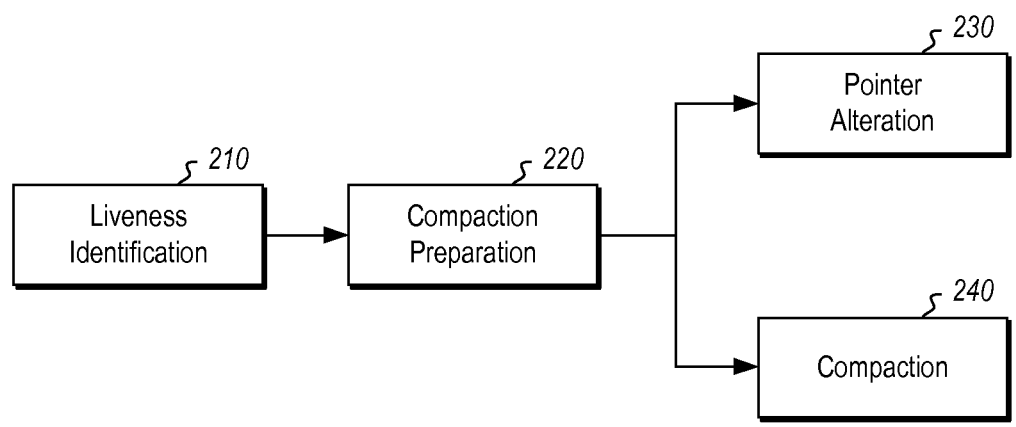
FIG. 2 abstractly illustrates various stages of operation associated with the garbage collection of objects within a heap.

FIG. 2 abstractly illustrates various stages of operation associated with the garbage collection of objects within a heap. The various operations may be performed with respect to the entire heap, or with respect to just a portion of the heap. For instance, in generational heaps, a portion of the heap (the newest generation) is reserved for the most newly created objects. As objects remain in the heap for longer, the objects tend to be promoted to the next generation of the heap associated with another portion of the heap. Garbage collection policies may be different with respect to each generation, with objects in the newer generations perhaps being garbage collected more frequently than objects in the older generations.

In accordance with FIG. 2, the first stage is the liveness identification stage 210 in which live objects and dead objects are determined. Live objects are those objects that are likely being used by active processes in the computing system, whereas dead objects are those objects that are not being used by active processes in the computing system. Mechanisms for distinguishing live objects from dead objects are known in the art, and thus will not be described in detail herein. Suffice it to say that the heap space that is occupied by dead objects may be regarded by the garbage collector as empty space that may be written over without consequence. The principles described herein may work with any mechanism for distinguishing live objects and dead objects within the heap, whether now existing, or whether yet to be developed.

After the liveness identification stage 210, the garbage collection process enters a compaction preparation stage 220. Unlike conventional compaction processes, the principles described herein can perform compaction on multiple adjacent objects at a time, provided that those adjacent sets of objects are all of an unpinned status. In the compaction preparation stage 220, the movement of each set of one or more adjacent unpinned object is determined and marked with a data structure called herein a gap that includes relocation information for the set of one or more adjacent unpinned objects. In accordance with some embodiments described herein, adjacent sets of pinned objects are also marked with a gap although those pinned objects will not be moved during compaction.

Following the compaction preparation stage 220, if the garbage collector decides to proceed with the compaction, there is a pointer alteration stage 230 and a compaction stage 240. In the pointer alteration stage 230, the pointers within objects to other objects are changed to reference the anticipated new location of the object that is pointed to. Thus, the pointers within the objects will reference the correct location after compaction. In the compaction stage 240, each set of one or more adjacent unpinned objects are moved in accordance with the relocation information within the corresponding gap.

Figure 3A:
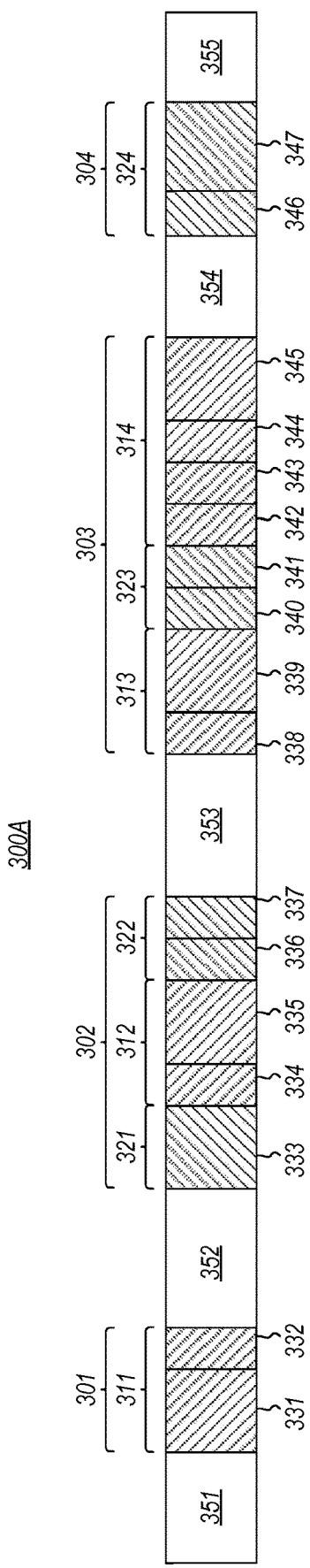

FIG. 3A illustrates an example of a heap structure 300A that includes an example configuration of live objects, some of which being pinned and some of which not being pinned. The heap structure 300A of FIG. 3A is an example in which the compaction preparation stage has not yet occurred. FIGS. 3B through 3I illustrate subsequent stages 300B through 300I of the heap structure. Objects that are pinned are illustrated with rightward leaning diagonal hash marking. Objects that are not pinned are illustrated with leftward leaning diagonal hash marking. Of course, the principles described herein may operate with any configuration and distribution of live objects within the heap. However, FIGS. 3A through 3I are provided simply to illustrate an example garbage collection operation.

The example heap structure 300A is illustrated as including four sets 301 through 304 of adjacent live objects, with interspersed empty space 351 through 355. The adjacent sets of live object each include multiple objects of varying pinned status. For instance, the first set 301 of adjacent live objects 301 includes only unpinned objects 311 (including objects 331 and 332). However, in this example, the second set 302 of adjacent live objects includes a first object 321 of a pinned status (object 333), followed by an adjacent set 312 of unpinned objects (including objects 334 and 335), followed by an adjacent set 322 of pinned objects (including objects 336 and 337). The third set 303 of adjacent live objects includes an adjacent set 313 of unpinned objects (including objects 338 and 339), followed by an adjacent set of pinned objects (including objects 340 and 341), followed by an adjacent set of unpinned objects (including objects 342 through 345). The final set 304 of adjacent live objects includes only an adjacent set 324 of pinned objects 324 (including objects 346 and 347).

Figure 4:
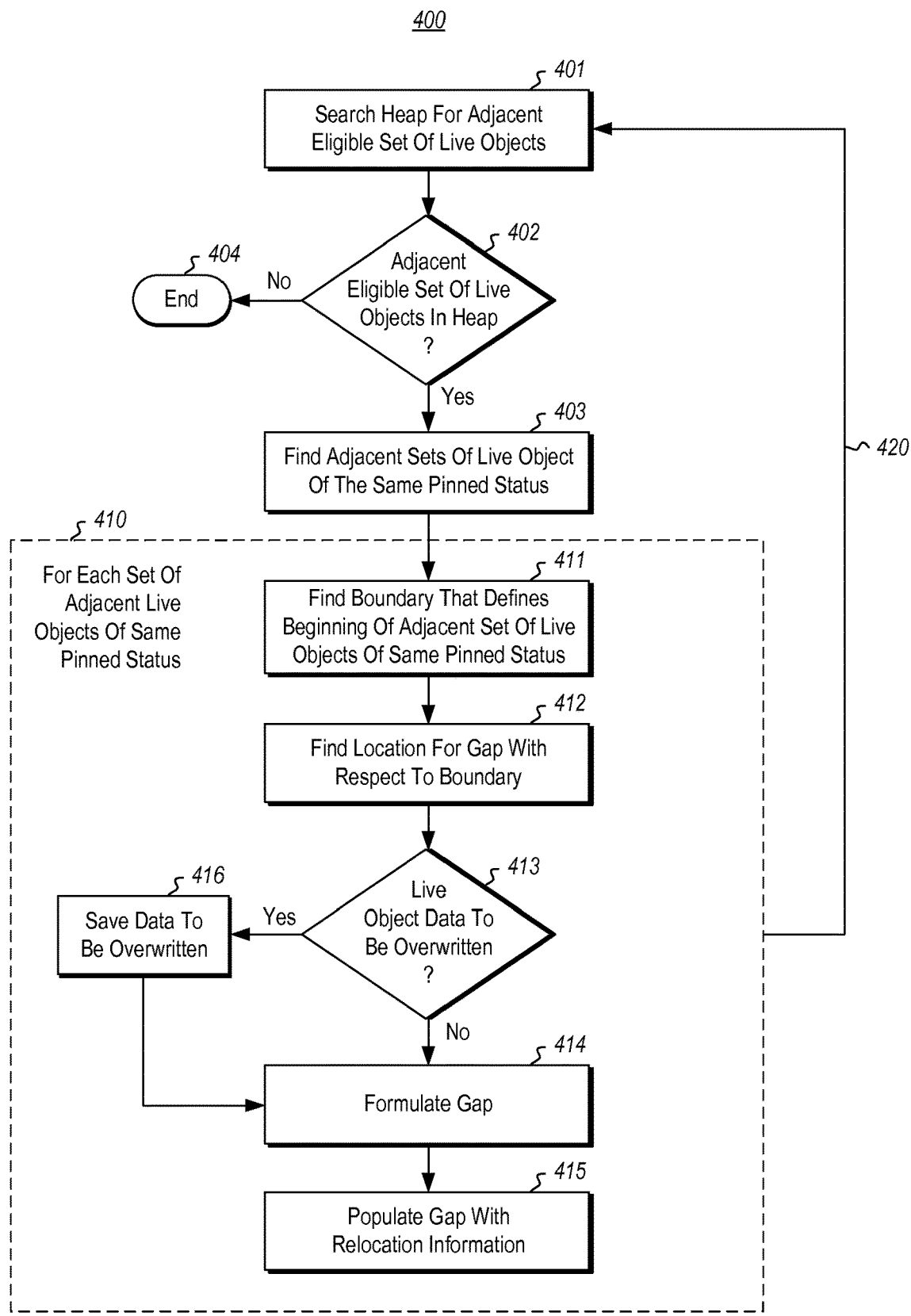
FIG. 4 illustrates a flowchart of a method for performing a compaction preparation stage of garbage collection on objects within a heap.

FIG. 4 illustrates a flowchart of a method 400 for performing a compaction preparation stage of garbage collection on objects within a heap. For instance, method 400 is one example of how the compaction preparation stage 220 of FIG. 2 might occur. The method involves searching the heap for an eligible adjacent set of live objects (act 401) until a eligible adjacent set of live objects is found ("Yes" in decision block 402), whereupon the remainder portions of the method 400 are portioned on that eligible adjacent set of live objects. An adjacent set of live objects is "eligible" within this meaning if there is empty space in the heap prior to the adjacent set of live objects. In that case, the adjacent set of live objects is considered eligible for compaction, and thus one or more gaps will be created for the adjacent set of live objects, and relocation information placed within those one or more gaps. Of course if no eligible adjacent set of live objects remains to be found in the heap ("No" in decision block 402) then, the method 400 may simply end (act 404), resulting in conclusion of the compaction preparation stage 220.

For instance, in FIG. 3A, the method 400 would involve the garbage collector scanning (act 401) the heap 300A until the adjacent set 301 of live objects is encountered ("Yes" in decision block 402). The adjacent set 301 of live objects is eligible for compaction since there is empty space 351 prior to the adjacent set 301 of live objects in the heap 300A.

The method then finds all sets of live objects having the same pinned status (act 403) within the adjacent set of live objects. For instance, in the case of the adjacent set 301 of live objects, there is but one set of adjacent objects of the same pinned status, and that is the adjacent set 311 of unpinned objects. Then the content of box 410 is performed for each found adjacent set of live objects of the same pinned status.

Specifically, a boundary is found that defines the beginning of the adjacent set of live objects of the same pinned status (act 411). For instance, in the case of the adjacent set of unpinned objects 311, the boundary is the left boundary of unpinned object 331. Then, a designated location for formulating a gap is identified with respect to the found boundary (act 412). In the example embodiment, this designated location is just immediately before the boundary. For instance, in FIG. 3A, the gap location would be just to the immediate left of the live object 331 within the heap. This would be part of empty space 351. That said, the location of the gap with respect to the boundary of the beginning of the adjacent set of live objects of the same pinned status may be any location that is known to the garbage collector. However, just to the immediate left of the boundary is a convenient location.

Figure 3B:
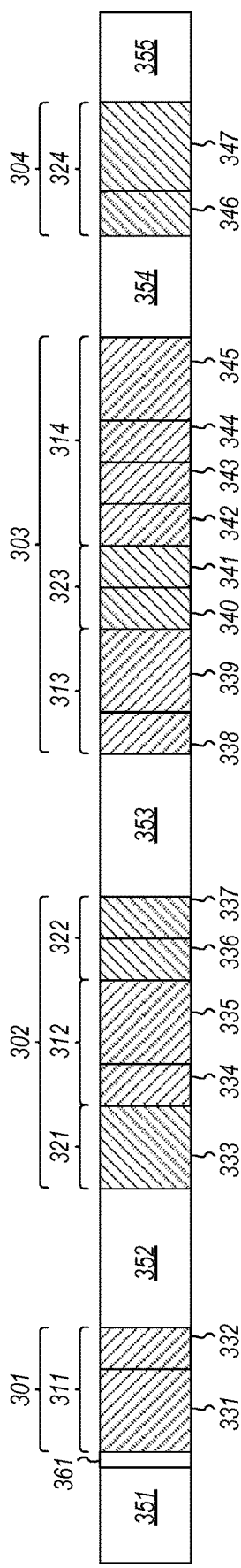

It is then determined whether or not any live data is to be overwritten as part of the creation of the gap (decision block 413). In the example, the gap is to be written into the right portion of the empty space 351. Accordingly, there is no data to be overwritten by creation of the gap ("No" in decision block 413). Accordingly, the gap is simply formulated (act 414) in a manner to be recognized by the garbage collector. Furthermore, the garbage collector indicates (act 415), in the formulated gap, data that is structured to be interpretable by the garbage collector as relocation information with respect to the adjacent set of one or more live objects of the same pinned status. For instance, the heap 300B of FIG. 3B is similar to the heap 300A of FIG. 3A, except that now the gap 361 is shown inserted just to the left of the live object 331. The relocation information within the gap 361 may specify that the adjacent set of unpinned objects may be moved to the left an amount of address spaces equal to the size of the original empty space 351.

The adjacent set 311 of unpinned objects was the only set of live objects of the same pinned status within the adjacent set of live objects 301. Accordingly, the box 410 need not be repeated for any other sets of live objects of the same pinned status. Thus, the method returns (as symbolized by arrow 420) back to the searching of the heap of adjacent sets of live objects (act 401), whereupon the search continues with respect to the heap in the heap state 300B of FIG. 3B.

The next adjacent set of live objects encountered ("Yes" in decision block 402) is adjacent set 302 of live objects in FIG. 3B. Here, all of the adjacent set of live objects of the same pinned status are found (act 403). For instance, in the adjacent set 302 of live objects, there is an adjacent set 321 of pinned objects (the set includes just one pinned object 333 in this particular case), an adjacent set 312 of unpinned objects (including objects 334 and 335), and yet another set 322 of pinned objects (including objects 336 and 337). Thus, the content of box 410 is performed for each of the adjacent sets 321, 312 and 322.

With respect to the adjacent set 321 of pinned objects, the boundary is found that defines the beginning of the adjacent set 321 of pinned objects (act 411). In FIG. 3B, this would be the left border of the pinned object 333. Then, the location for the gap is determined with respect to this boundary (act 412). In the example, the location for the gap is just to the immediate left of the boundary. That said, the location for the gap may be anywhere with respect to the boundary, so long as the location is deterministic at the time of compaction. For instance, the location may be well before, or even after, the boundary defining the beginning of the adjacent set of live objects of the same pinned status.

In this case, live data is not to be written over to formulate the gap ("No" in decision block 413). This is because the gap will be contained in the very right of the empty space 352. Accordingly, as illustrated in the heap state 300C of FIG. 3C, the gap 362 is formulated (act 414) at the right portion of empty space 352. Furthermore, the gap 362 is populated (act 415) with relocation information for compacting the adjacent set of pinned objects. However, note that pinned objects may not be moved during compaction. This is perhaps because the references to the pinned objects cannot be changed. Accordingly, in this case, the relocation information will simply indicate no movement is to be made of the adjacent set of live objects.

Figure 3C:
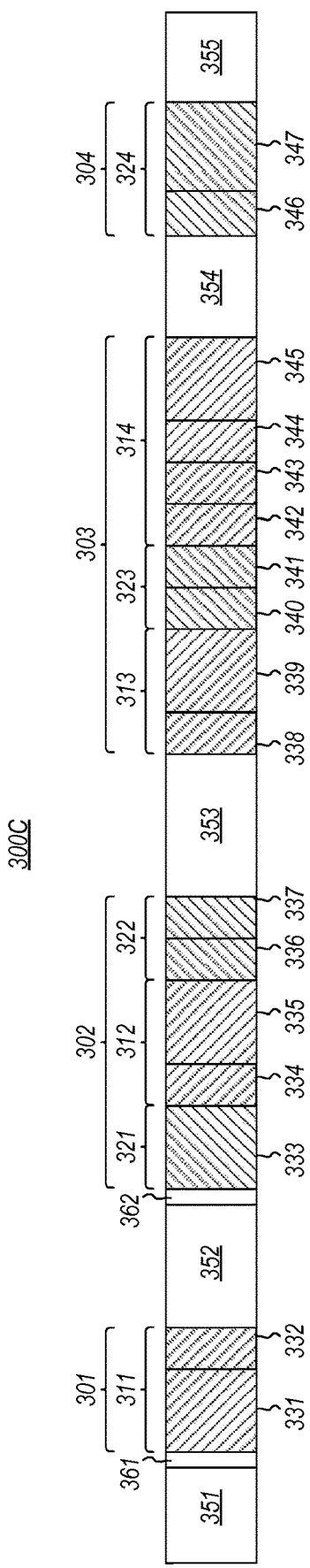

Now with respect to the adjacent set 312 of unpinned objects, the boundary is found that defines the beginning of the adjacent set 312 of unpinned objects (act 411). In FIG. 3C, this would be the left border of the unpinned object 334, which is the boundary between one or more adjacent pinned objects 321 and one or more adjacent non-pinned objects 312 within the adjacent set 302 of live objects. Then, the location for the gap is determined with respect to this boundary (act 412), which is just to the left of object 334 in this example. In this case, live data is to be written over to formulate the gap ("Yes" in decision block 413). This is because the gap will be contained in the very right of the live object 333. Accordingly, the garbage collector saves information that would be overwritten at the designated location due to the anticipated formulation of the gap (act 416). For instance, the very right portion of live object 333 is saved to a memory location that is ideally not part of the heap. Thereafter, as illustrated in the heap state 300D of FIG. 3D, the gap 363 is formulated (act 414) at the right portion of the live object 333. Furthermore, the gap 363 is populated (act 415) with relocation information for compacting the adjacent set 312 of unpinned objects.

Figure 3D:
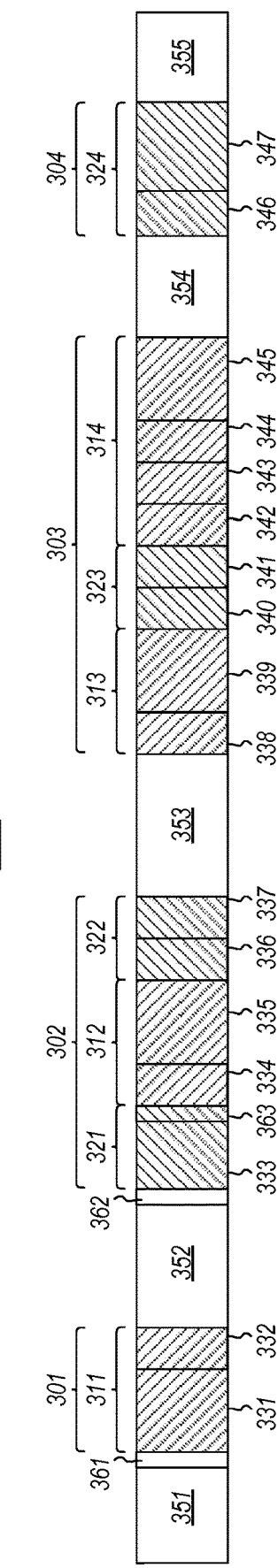

Now with respect to the adjacent set 322 of pinned objects, the boundary is found that defines the beginning of the adjacent set 322 of pinned objects (act 411). In FIG. 3D, this would be the left border of the pinned object 336, which is the boundary between one or more adjacent pinned objects 322 and one or more adjacent non-pinned objects 312 within the adjacent set 302 of live objects. Then, the location for the gap is determined with respect to this boundary (act 412), which is just to the left of object 336 in this example. In this case, live data is to be written over to formulate the gap ("Yes" in decision block 413). This is because the gap will be contained in the very right of the live object 335. Accordingly, the garbage collector saves information that would be overwritten at the designated location due to the anticipated formulation of the gap (act 416). For instance, the very right portion of live object 335 is saved to a memory location that is ideally not part of the heap. Thereafter, as illustrated in the heap state 300E of FIG. 3E, the gap 364 is formulated (act 414) at the right portion of the live object 335. Furthermore, the gap 364 is populated (act 415) with relocation information for compacting the adjacent set 322 of pinned objects. However, since the adjacent set 322 of pinned objects may not be moved during compaction, the relocation information will simply indicate no movement is to be made of the adjacent set 322 of pinned objects.

All of the adjacent sets 321, 312 and 322 of the same pinned status of the adjacent set of live objects 302 have now been subject to the content of the box 410. Thus, the method 400 returns (as symbolized by arrow 420) back to the searching of the heap of adjacent sets of live objects (act 401), whereupon the search continues with respect to the heap in the heap state 300E of FIG. 3E.

The next adjacent set of live objects encountered ("Yes" in decision block 402) is adjacent set 303 of live objects in FIG. 3E. Here, all of the adjacent set of live objects of the same pinned status are found (act 403). For instance, in the adjacent set 303 of live objects, there is an adjacent set 313 of unpinned objects (containing objects 338 and 339), an adjacent set 323 of pinned objects (containing objects 340 and 341), and yet another adjacent set 314 of unpinned objects (containing objects 342 through 345). Thus, the content of box 410 is performed for each of the adjacent sets 313, 323 and 314.

With respect to the adjacent set 313 of unpinned objects, the boundary is found that defines the beginning of the adjacent set 313 of unpinned objects (act 411). In FIG. 3E, this would be the left border of the unpinned object 338. Then, the location for the gap is determined with respect to this boundary (act 412), which is immediately to the left in this example. In this case, live data is not to be written over to formulate the gap ("No" in decision block 413). This is because the gap will be contained in the very right of the empty space 353. Accordingly, as illustrated in the heap state 300F of FIG. 3F, the gap 365 is formulated (act 414) at the right portion of empty space 353. Furthermore, the gap 365 is populated (act 415) with relocation information for compacting the adjacent set of pinned objects.

Now with respect to the adjacent set 323 of pinned objects, the boundary is found that defines the beginning of the adjacent set 323 of pinned objects (act 411). In FIG. 3F, this would be the left border of the pinned object 340, which is the boundary between one or more adjacent pinned objects 323 and one or more adjacent non-pinned objects 313 within the adjacent set 303 of live objects. Then, the location for the gap is determined with respect to this boundary (act 412), which is just to the left of object 340 in this example. In this case, live data is to be written over to formulate the gap ("Yes" in decision block 413). This is because the gap will be contained in the very right of the live object 339. Accordingly, the garbage collector saves information that would be overwritten at the designated location due to the anticipated formulation of the gap (act 416). For instance, the very right portion of live object 339 is saved to a memory location that is ideally not part of the heap. Thereafter, as illustrated in the heap state 300G of Figure G, the gap 366 is formulated (act 414) at the right portion of the live object 339. Furthermore, the gap 366 is populated (act 415) with relocation information for compacting the adjacent set 323 of pinned objects. However, since the adjacent set 323 of pinned objects may not be moved during compaction, the relocation information will simply indicate no movement is to be made of the adjacent set 323 of pinned objects.

Figure 3G:
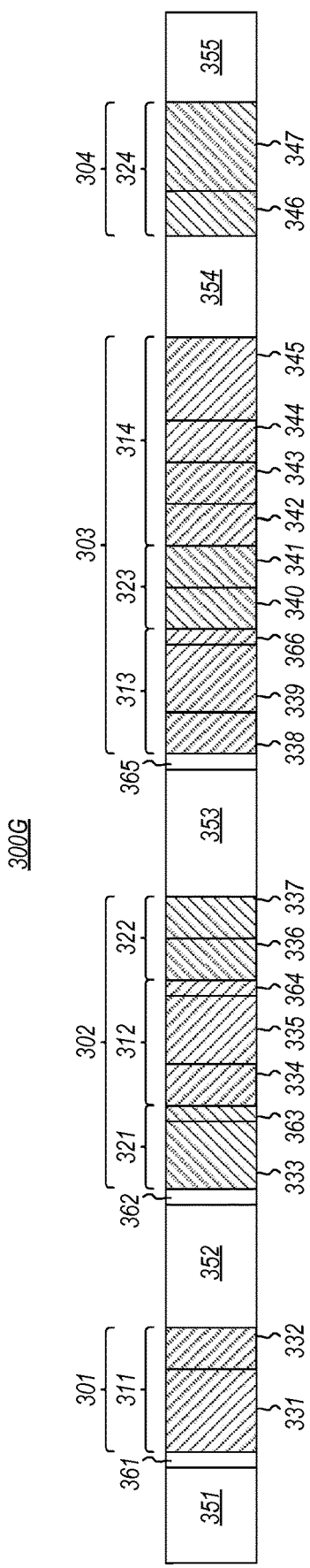

Now with respect to the adjacent set 314 of pinned objects, the boundary is found that defines the beginning of the adjacent set 314 of unpinned objects (act 411). In FIG. 3G, this would be the left border of the unpinned object 342, which is the boundary between one or more adjacent pinned objects 323 and one or more adjacent non-pinned objects 314 within the adjacent set 303 of live objects. Then, the location for the gap is determined with respect to this boundary (act 412), which is just to the left of object 342 in this example. In this case, live data is to be written over to formulate the gap ("Yes" in decision block 413). This is because the gap will be contained in the very right of the live object 341. Accordingly, the garbage collector saves information that would be overwritten at the designated location due to the anticipated formulation of the gap (act 416). For instance, the very right portion of live object 341 is saved to a memory location that is ideally not part of the heap. Thereafter, as illustrated in the heap state 300H of FIG. 3H, the gap 367 is formulated (act 414) at the right portion of the live object 341. Furthermore, the gap 367 is populated (act 415) with relocation information for compacting the adjacent set 314 of unpinned objects.

All of the adjacent sets 313, 323 and 314 of the same pinned status of the adjacent set of live objects 303 have now been subject to the content of the box 410. Thus, the method 400 returns (as symbolized by arrow 420) back to the searching of the heap of adjacent sets of live objects (act 401), whereupon the search continues with respect to the heap in the heap state 300H of FIG. 3H.

Figure 3H:
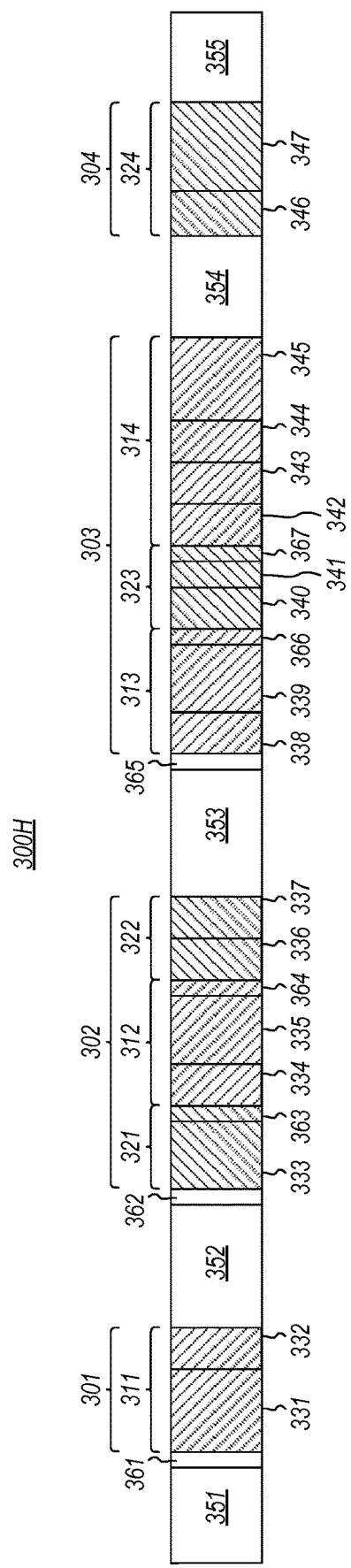
Figure 3I:
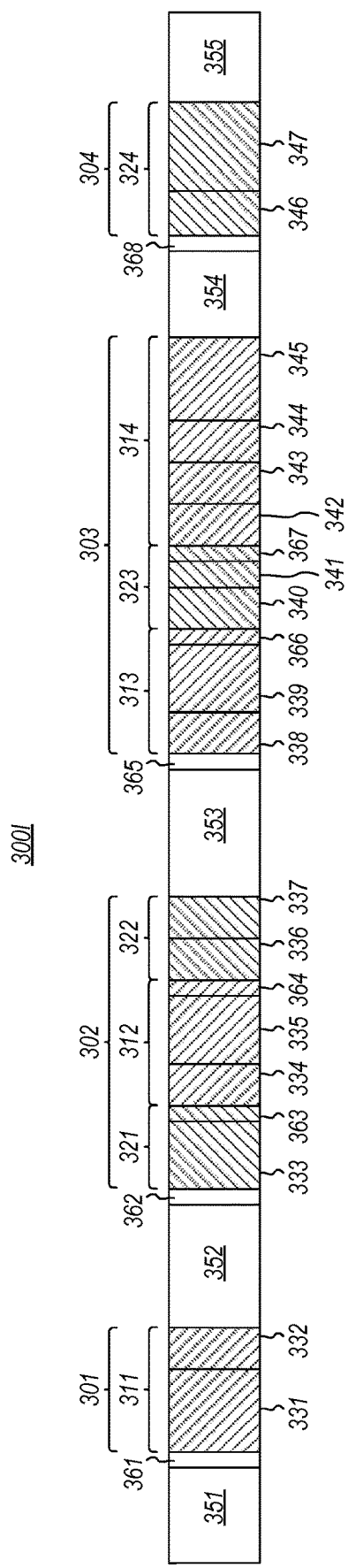

The next adjacent set of live objects encountered ("Yes" in decision block 402) is adjacent set 304 of live objects in FIG. 3H. Here, all of the adjacent set of live objects of the same pinned status are found (act 403). However, there is only one adjacent set of live objects of the same pinned status within the adjacent set 304 of live objects, which is the adjacent set 324 of pinned objects (containing objects 346 and 347). Thus, the content of box 410 is performed for only the adjacent set 324 of pinned objects. Accordingly, the boundary is found that defines the beginning of the adjacent set 324 of pinned objects (act 411). In FIG. 3H, this would be the left border of the pinned object 346. Then, the location for the gap is determined with respect to this boundary (act 412), which is immediately to the left in this example. In this case, live data is not to be written over to formulate the gap ("No" in decision block 413). This is because the gap will be contained in the very right of the empty space 354. Accordingly, as illustrated in the heap state 300I of FIG. 3I, the gap 368 is formulated (act 414) at the right portion of empty space 354. Furthermore, the gap 368 is populated (act 415) with relocation information for compacting the adjacent set of pinned objects. However, since the adjacent set 324 of pinned objects may not be moved during compaction, the relocation information will simply indicate no movement is to be made of the adjacent set 323 of pinned objects.

The adjacent set 324 of pinned objects was the only set of live objects of the same pinned status within the adjacent set of live objects 304. Accordingly, the box 410 need not be repeated for any other sets of live objects of the same pinned status. Thus, the method 400 returns (as symbolized by arrow 420) back to the searching of the heap of adjacent sets of live objects (act 401), whereupon the search continues with respect to the heap in the heap state 300I of FIG. 3I. However, there are no remaining adjacent sets of live objects within the heap ("No" in decision block 402), causing the method 400 to end (act 404).

Thus, the examples of FIGS. 3A through 3I show the heaps transformation from the beginning of the compaction preparation stage 220 to the end of the compaction preparation stage 220. Now that the movement of the compaction stage 240 is understood a priori, during the pointer adjustment stage 230, any pointers within the live objects to other live objects may be adjusted to reference the anticipated new location of the live object that is pointed to. In some cases, these pointers may be within the saved information. For instance, recall that the right portions of live objects 333, 335, 339 and 341 had been saved to a memory location outside of the heap prior to being written over by a gap. During the pointer adjustment stage 230, if there are any pointers within the saved off information for the live objects 333, 335, 339 or 341, those pointers are adjusted in the saved off information.

Figure 5:
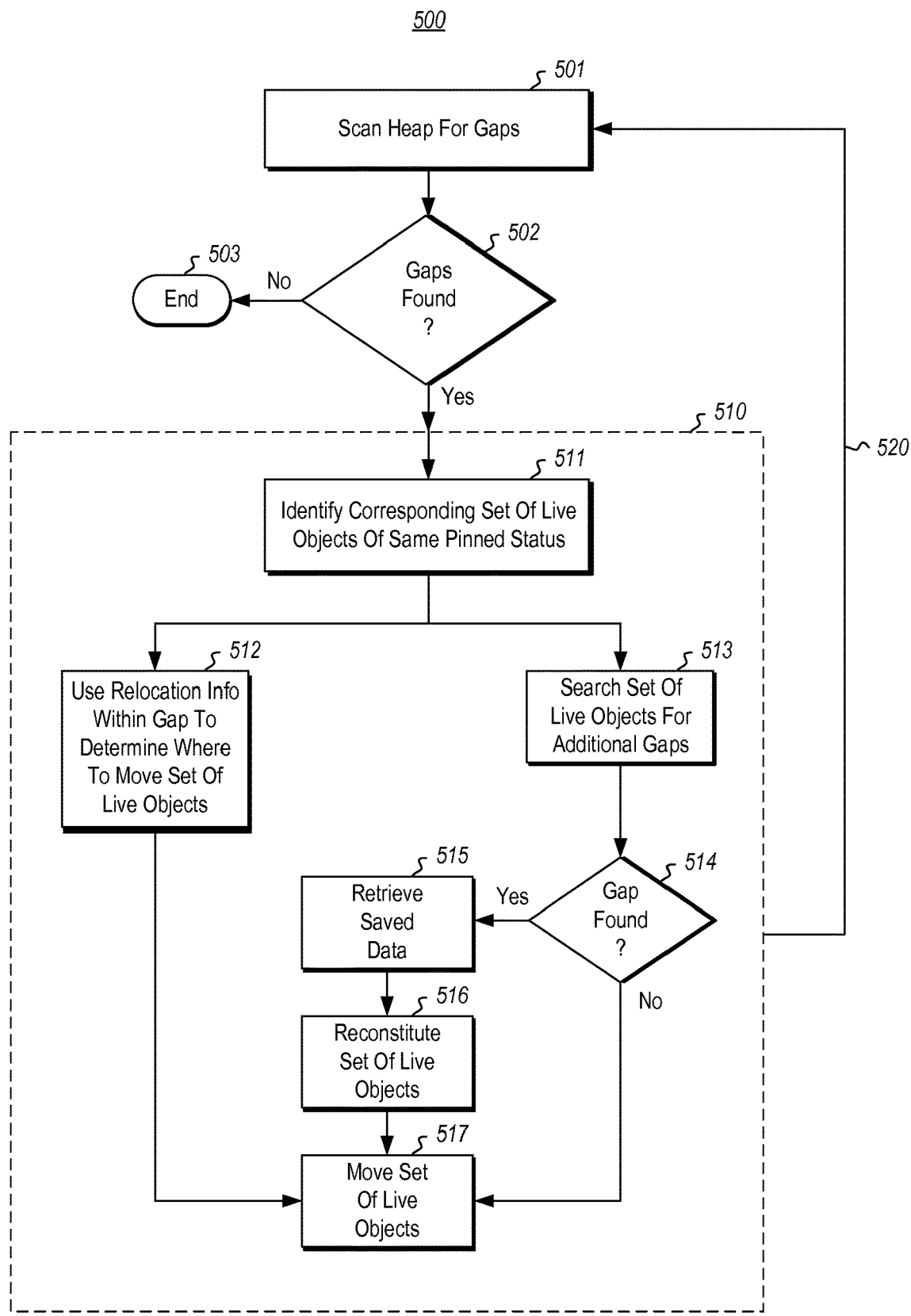
FIG. 5 illustrates a flowchart of a method for performing the compaction stage of a garbage collection process.

At this point, the garbage collector is ready to use the heap to perform the compaction stage 320. FIG. 5 illustrates a flowchart of a method 500 for performing the compaction stage of a garbage collection process. The method 500 represents an example of the compaction stage 240 of FIG. 2, and is compatible with the compaction preparation stage of the method 400 of FIG. 4.

Figure 6A:
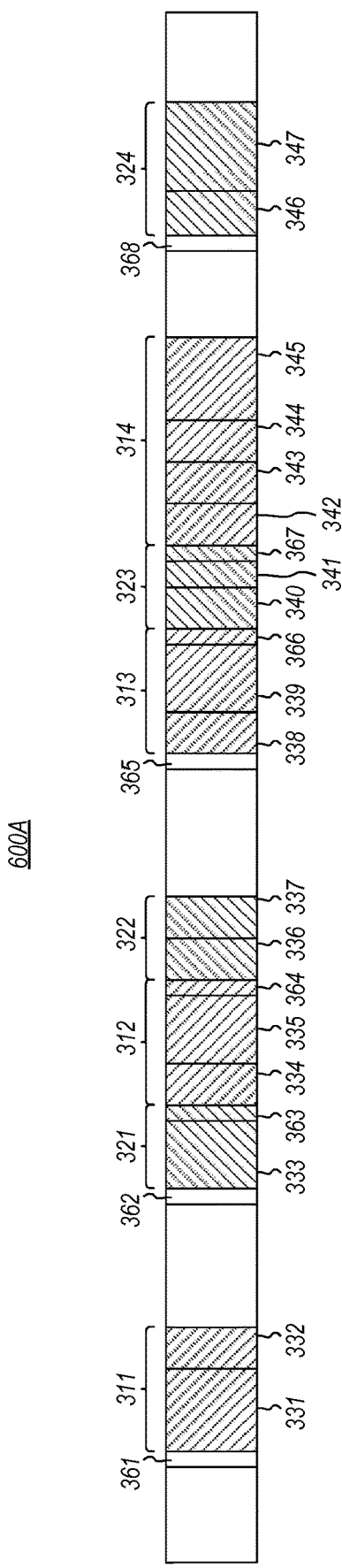
FIGS. 6A through 6E illustrate various states of the example heap of FIGS. 3A through 3I as the heap is processed through a compaction stage following the method of FIG. 5.

The heap is once again scanned (act 501) but this time in search of the gaps that are recognized by the garbage collector as containing relocation information. For instance, in the context of FIG. 3I, there are eight of such gaps 361 through 368 that would be recognized by the garbage collector as containing relocation information with respect to corresponding adjacent sets 311, 321, 312, 322, 313, 323, 314 and 324, respectively, of live objects of the same pinned status. FIG. 6A shows an initial heap state 600A at the beginning of the compaction stage, and is identical to the final heap state 300I at the end of the compaction preparation stage (but of course with potential pointer readjustment during the stage 230). However, as the adjacent set of live objects 301 through 304 is no longer an important distinction, those labels are removed for clarity. Furthermore, as the dead and live space will be readjusted during compaction, the dead spaces 351 through 355 are also not labelled.

The scanning occurs until there are no longer any gaps found in the remainder of the heap ("No" in decision block 502), at which point the compaction stage has completed (act 503). However, if there is a gap found in the heap ("Yes" in decision block 502), then the content of box 510 is performed.

In particular, the corresponding set of one or more live objects of the same pinned status that the gap corresponds to is found (act 511). Then, relocation information within the found gap is used to determine where to move the corresponding set of live objects to (act 512). Furthermore, the corresponding set of live objects is searched for any addition formulated gaps (act 513). If there are such gaps ("Yes" in decision block 514), the saved information that was overwritten by that gap is retrieved (act 515) to thereby reconstitute the corresponding set of live objects (act 516). If there were no gaps found ("No" in decision block 514), or after the adjacent set of live objects is reconstituted (act 516) from the saved data if gaps are found ("Yes" in decision block 514), and after it is determined where to move the corresponding set of live objects of the same pinned status (act 512), then the corresponding adjacent set of live objects of the same status is moved in the heap accordingly (act 517).

Thereafter, the method 500 returns (as represented by arrow 520) to again search the heap for gaps (act 501).

Figure 6B:
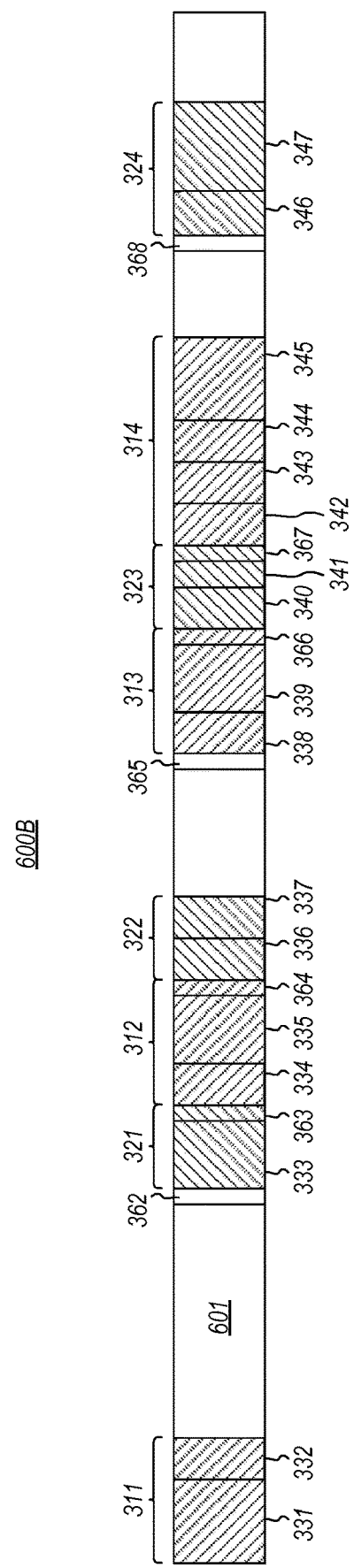

For instance, in FIG. 6A, the gap 361 would first be encountered ("Yes in decision block 502) triggering the content of box 510 to be performed with respect to the adjacent set 311 of unpinned objects, which is properly identified in act 511. The relocation information within the gap 361 is used to determine that the adjacent set 311 of unpinned objects should be moved all the way to the beginning of the heap (act 512). Furthermore, no other gaps are found within the adjacent set 311 of unpinned objects ("No" in decision block 514). Accordingly, the adjacent set of unpinned objects is shifted to the beginning of the heap (act 517). The resultant heap state 600B is illustrated in FIG. 6B. Note that this shifting creates a large piece of empty space 601 within the heap. The method 500 then returns (as represented by arrow 520) to continue the search through the heap state 600B of FIG. 6B for more gaps.

In FIG. 6B, the gap 362 would next be encountered ("Yes in decision block 502) triggering the content of box 510 to be performed with respect to the adjacent set 321 of pinned objects, which is properly identified in act 511. The relocation information within the gap 362 is used to determine that the adjacent set 321 of pinned objects should not be moved (act 512). However, there are other gaps (e.g., gap 363) found within the adjacent set 321 of pinned objects ("Yes" in decision block 514). Accordingly, the saved portion of pinned object is retrieved (act 515) to reconstitute the adjacent set of pinned objects 321 (act 516). This reconstitution may, however, be delayed until the next adjacent set of live objects of the same status is moved. Accordingly, the gap 363 remains in the heap. Alternatively, the gap 363 could be retrieved into system memory outside of the heap and flagged as the next gap for the next scan operation. The method 500 then returns (as represented by arrow 520) to continue the search through the heap state 600B of FIG. 6B for more gaps.

Figure 6C:
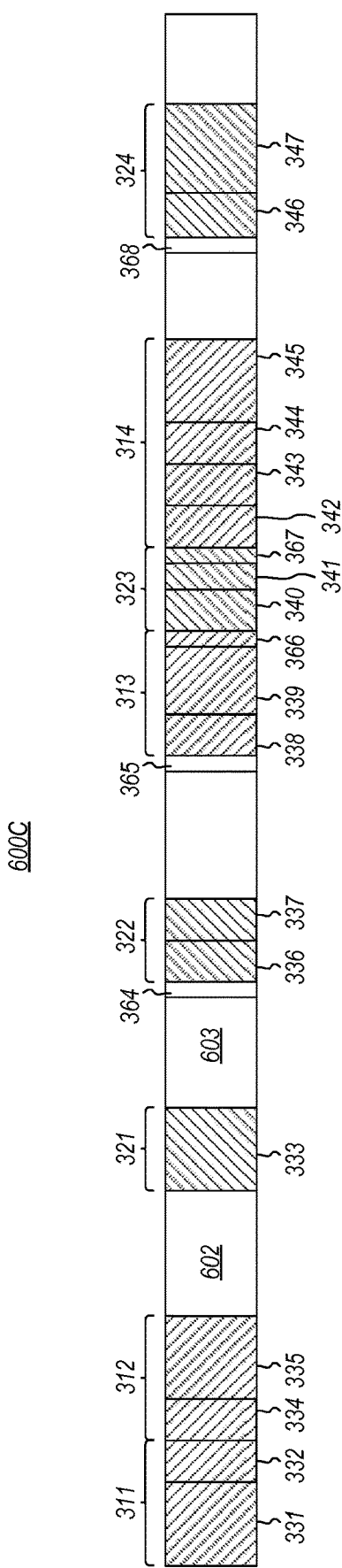

Again in FIG. 6B, the gap 363 would next be encountered ("Yes in decision block 502) triggering the content of box 510 to be performed with respect to the adjacent set 312 of unpinned objects, which is properly identified in act 511. The relocation information within the gap 363 is used to determine where the adjacent set 312 of unpinned objects should be moved (act 512). Furthermore, there are other gaps (e.g., gap 364) found within the adjacent set 312 of unpinned objects ("Yes" in decision block 514). Accordingly, the saved portion of unpinned object 335 is retrieved (act 515) to reconstitute (act 516) the adjacent set 312 of unpinned objects. The reconstituted adjacent set 312 of unpinned objects is shifted to the beginning of the free space 601 (act 517) within the heap. The resultant heap state 600C is illustrated in FIG. 6C. The method 500 then returns (as represented by arrow 520) to continue the search through the heap state 600C of FIG. 6C for more gaps. Note the presence of free space 602 and 603 within the heap state 600C.

In FIG. 6C, the gap 364 would next be encountered ("Yes in decision block 502) triggering the content of box 510 to be performed with respect to the adjacent set 322 of pinned objects, which is properly identified in act 511. The relocation information within the gap 364 is used to determine that the adjacent set 322 of pinned objects should not be moved (act 512). Furthermore, there no other gaps found within the adjacent set 322 of pinned objects ("No" in decision block 514). Accordingly, the adjacent set 322 of pinned objects remains in place (act 517) The method 500 then returns (as represented by arrow 520) to continue the search through the heap state 600C of FIG. 6C for more gaps.

Figure 6D:
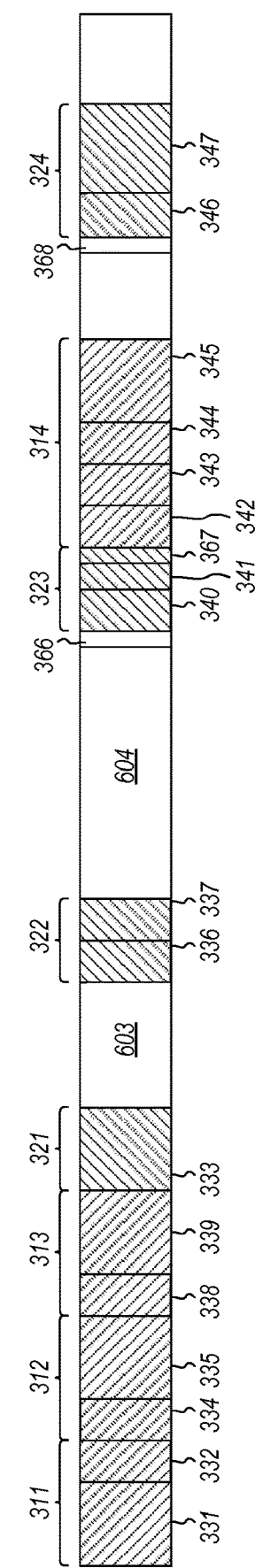

Again in FIG. 6C, the gap 365 would next be encountered ("Yes in decision block 502) triggering the content of box 510 to be performed with respect to the adjacent set 313 of unpinned objects, which is properly identified in act 511. The relocation information within the gap 365 is used to determine where the adjacent set 313 of unpinned objects should be moved (act 512). In fact, the relocation information indicates that the adjacent set 313 of unpinned objects should be moved into free space 602. Furthermore, there are other gaps (e.g., gap 366) found within the adjacent set 313 of unpinned objects ("Yes" in decision block 514). Accordingly, the saved portion of unpinned object 339 is retrieved (act 515) to reconstitute (act 516) the adjacent set 313 of unpinned objects. The reconstituted adjacent set 313 of unpinned objects is shifted into the free space 601 (act 517) within the heap, where it just fits. The resultant heap state 600D is illustrated in FIG. 6D. Note the presence of a small free space 603 and a larger free space 604. The method 500 then returns (as represented by arrow 520) to continue the search through the heap state 600D of FIG. 6D for more gaps.

In FIG. 6D, the gap 366 would next be encountered ("Yes in decision block 502) triggering the content of box 510 to be performed with respect to the adjacent set 323 of pinned objects, which is properly identified in act 511. The relocation information within the gap 366 is used to determine that the adjacent set 323 of pinned objects should not be moved (act 512). However, there are other gaps (e.g., gap 367) found within the adjacent set 323 of pinned objects ("Yes" in decision block 514). Accordingly, the saved portion of pinned object 341 is retrieved (act 515 to reconstitute (act 516) the adjacent set 323 of pinned objects. This reconstitution may, however, be delayed until the next adjacent set of live objects of the same status is moved. Accordingly, the gap 367 remains in the heap. Alternatively, the gap 367 could be retrieved into system memory outside of the heap and flagged as the next gap for the next scan operation. The method 500 then returns (as represented by arrow 520) to continue the search through the heap state 600D of FIG. 6D for more gaps.

Figure 6E:
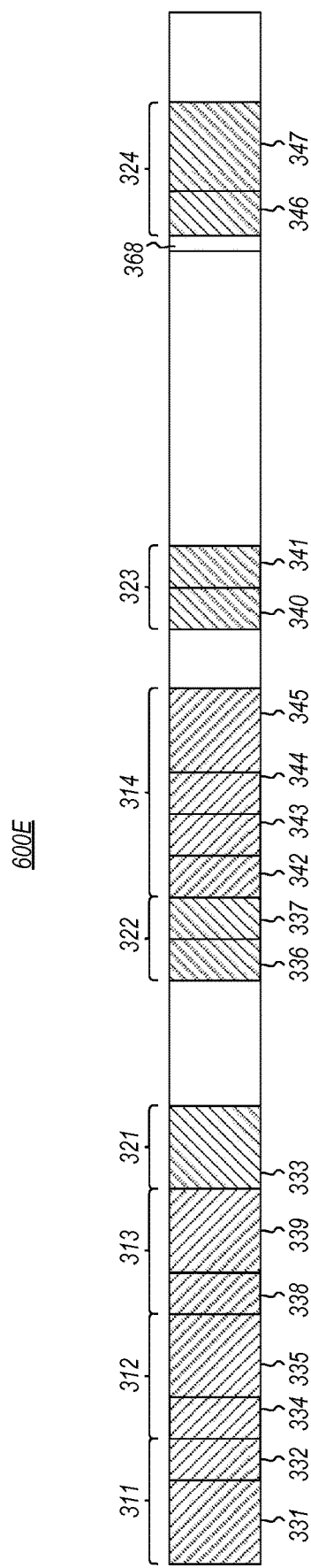

Again in FIG. 6D, the gap 367 would next be encountered ("Yes in decision block 502) triggering the content of box 510 to be performed with respect to the adjacent set 314 of unpinned objects, which is properly identified in act 511. The relocation information within the gap 367 is used to determine where the adjacent set 314 of unpinned objects should be moved (act 512). In fact, the relocation information indicates that the adjacent set 314 of unpinned objects should be moved into free space 604 (as there is no room in free space 603). Furthermore, there are no other gaps found within the adjacent set 314 of unpinned objects ("No" in decision block 514). Accordingly, the adjacent set 314 of unpinned objects is shifted into the free space 604 (act 517) within the heap. The resultant heap state 600E is illustrated in FIG. 6E. The method 500 then returns (as represented by arrow 520) to continue the search through the heap state 600E of FIG. 6E for more gaps.

In FIG. 6E, the final gap 368 would next be encountered ("Yes in decision block 502) triggering the content of box 510 to be performed with respect to the adjacent set 324 of pinned objects, which is properly identified in act 511. The relocation information within the gap 368 is used to determine that the adjacent set 324 of pinned objects should not be moved (act 512). Furthermore, there are no other gaps found within the adjacent set 323 of pinned objects ("No" in decision block 514). Accordingly, the adjacent set 324 is not moved (act 517).

The method 500 then returns (as represented by arrow 520) to continue the search through the heap state 600E of FIG. 6E for more gaps. However, there are no further gaps ("No" in decision block 502). Accordingly, the method ends (act 503), thereby ending the compaction stage of the garbage collection.

Note that those objects that were pinned (including pinned objects 333, 336, 337, 340, 341, 346 and 347 have remained in place. Meanwhile, those objects that were not pinned (including non-pinned objects 331, 332, 334, 335, 338, 339, 342, 343, 344 and 344) have been shifted to compact those objects further leftward, even though there are pinned objects that remain to block the effort somewhat. Accordingly, the principles described herein allow for efficient compaction of unpinned objects in a heap, while honoring the pinned status of the pinned objects within the heap.

Furthermore, the compaction occurred with often multiple objects being moved at one time. This greatly increases the efficiency of the compaction process as a whole. While in the example of FIGS. 3A through 3I and 6A through 6E involved only a small number of adjacent objects within each adjacent set of live objects of the same pinned status, there might often be many more adjacent sets of live objects of the same pinned status. This is because often there are only a few pinned objects within a heap. Accordingly, the efficiencies associated with moving more than one object at a time during the compaction operation may be quite significant.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system comprising one or more processors, for performing garbage collection on objects within a heap of a computing system, the method comprising:
    finding a set of adjacent live objects within the heap, the set of adjacent live objects including at least:
    one or more adjacent pinned objects that are pinned at an original location on the heap; and
    one or more adjacent non-pinned objects that are located at a different location on the heap and are not pinned to the different location on the heap;
    finding a boundary between the one or more adjacent pinned objects and the one or more adjacent non-pinned objects within the set of adjacent live objects;
    identifying a designated location for formulating a gap with respect to the boundary, wherein the designated location for formulating the gap comprises an overlapping portion that overlaps at least a portion of either the one or more adjacent pinned objects or the one or more adjacent non-pinned objects;
    saving information stored in the overlapping portion that would be overwritten at the designated location due to the anticipated formulation of the gap;
    after saving the information, formulating the gap at the designated location in a manner to be recognized by the garbage collector, the formulation of the gap causing the overlapping portion to be overwritten;
    indicating, in the formulated gap, data that is structured to be interpretable by the garbage collector as relocation information with respect to the one or more adjacent non-pinned objects;
    operating the garbage collector on the heap to relocate the one or more adjacent non-pinned objects according to the relocation information indicated in the formulated gap;
    identifying whether the saved information comprises data from the one or more adjacent pinned objects or data from the one or more adjacent non-pinned objects; and
    reconstituting the saved information back to a location on the heap according to whether the saved information includes data from the one or more adjacent pinned objects or from the one or more adjacent non-pinned objects, wherein when the saved information includes data from the one or more adjacent pinned objects, the data is reconstituted back to the original location on the heap associated with the one or more adjacent pinned objects, but when the saved information includes data from the one or more adjacent non-pinned objects, the data is reconstituted back to the heap according to the relocation of the one or more adjacent non-pinned objects.

2. The method in accordance with claim 1, the boundary being a first found boundary, the designated location being a first designated location, the one or more adjacent pinned objects being a first set of one or more adjacent pinned objects, the one or more adjacent non-pinned objects being a first set of one or more adjacent non-pinned objects, the method further comprising:
    finding a second boundary between a second set of one or more adjacent pinned objects and a second set of one or more adjacent non-pinned objects within the set of live objects;
    identifying a second designated location for formulating a gap with respect to the second found boundary;
    saving information that would be overwritten at the second designated location due to the anticipated formulation of the second gap;
    after saving the information that would be overwritten at the second designated location, formulating the second gap in a manner to be recognized by the garbage collector at the second designated location; and
    indicating, in the formulated second gap, data that is structured to be interpretable by the garbage collector as relocation information with respect to either the second set of one or more adjacent pinned objects or the second set of one or more adjacent non-pinned objects.

3. The method in accordance with claim 2, the first set of one or more adjacent pinned objects and the second set of one or more adjacent pinned objects being the same such that the first and second boundaries bound the set of one or more adjacent pinned objects.

4. The method in accordance with claim 2, the first set of one or more adjacent non-pinned objects and the second set of one or more adjacent non-pinned objects being the same such that the first and second boundaries bound the set of one or more adjacent non-pinned objects.

5. The method in accordance with claim 1, the set of live objects being a first set of live objects, the boundary being a first found boundary, the designated location being a first designated location, and the gap being a first gap, the method further comprising:
    finding a second set of live objects within the heap;

finding a second boundary between one or more adjacent pinned objects and one or more adjacent non-pinned objects within the second set of live objects;

identifying a second designated location for formulating a gap with respect to the found second boundary in the second set of live objects;

saving information that would be overwritten at the second designated location due to the anticipated formulation of the second gap;

after saving the information that would be overwritten at the second designated location, formulating the second gap at the second designated location in a manner to be recognized by the garbage collector; and indicating, in the formulated second gap, data that is structured to be interpretable by the garbage collector as relocation information with respect to either the one or more adjacent pinned objects in the second set of live objects or the one or more adjacent non-pinned objects in the second set of live objects.

6. The method in accordance with claim 1, the designated location for formulating a gap with respect to the boundary being a location before the boundary within the earlier of the one or more adjacent pinned objects or the one or more adjacent non-pinned objects.

7. The method in accordance with claim 6, the designated location for formulating a gap with respect to the boundary being a location immediately before the boundary within the earlier of the one or more adjacent pinned objects or the one or more adjacent non-pinned objects.

8. The method in accordance with claim 1, the designated location for formulating a gap with respect to the boundary being a location after the boundary within the latter of the one or more adjacent pinned objects or the one or more adjacent non-pinned objects.

9. The method in accordance with claim 1, wherein there is an inherent gap just prior to the adjacent set of live objects within the heap, the method further comprising:

identifying an initial set of adjacent objects of the same pinned status within the adjacent set of live objects; and indicating, in the inherent gap, data that is structured to be interpretable by the garbage collector as relocation information for the initial set of adjacent objects.

10. The method in accordance with claim 1, further comprising the following at a later stage of the garbage collection:

finding the gap at the designated location with respect to the boundary within the adjacent set of live objects;

using the relocation information within the found gap to determine where to relocate either the one or more adjacent pinned objects or the one or more adjacent non-pinned objects; and relocating the adjacent objects of the same pinned status in accordance with the relocation information.

11. The method in accordance with claim 10, wherein the relocating the adjacent objects of the same pinned status in accordance with the relocation information further comprises:

determining if there are any gaps within the adjacent objects of the same pinned status; and for any found gaps within the adjacent objects of the same pinned status, retrieving saved information corresponding to those found gaps, so that the original adjacent objects of the same pinned status are relocated.

12. The method in accordance with claim 1, further comprising the following at a later stage of the garbage collection:

scanning the heap for each of a plurality of gaps, and when each of at least some of the plurality of gaps including the formulated gap is found, performing the following:

identifying a corresponding set of one or more live objects of the same pinned status that the found gap corresponds to;

using relocation information within the found gap to relocate the corresponding set of one or more live objects;

finding a formulated gap within the corresponding set of one or more live objects that resulted in saved information being saved; and reconstituting the corresponding set of one or more live objects by recovering the saved information.

13. The method of claim 1, wherein the designated location for formulating the gap with respect to the boundary overlaps a portion of the one or more adjacent non-pinned objects such that reconstituting the saved information back to a location on the heap comprises reconstituting the saved information back to a location on the heap other than the different location.

14. A computer program product comprising one or more computer-readable hardware storage devices having stored thereon computer-executable instructions that are structured such that, when executed by one or more processors of a computing system, cause the computing system to perform a method for performing garbage collection on objects within a heap of a computing system, the method comprising:

finding a set of adjacent live objects within the heap, the set of adjacent live objects including at least:

one or more adjacent pinned objects that are pinned at an original location on the heap; and one or more adjacent non-pinned objects that are located at a different location on the heap and are not pinned to the different location on the heap;

finding a boundary between the one or more adjacent pinned objects and the one or more adjacent non-pinned objects within the set of adjacent live objects;

identifying a designated location for formulating a gap with respect to the boundary, wherein the designated location for formulating the gap comprises an overlapping portion that overlaps at least a portion of either the one or more adjacent pinned objects or the one or more adjacent non-pinned objects;

saving information stored in the overlapping portion that would be overwritten at the designated location due to the anticipated formulation of the gap;

after saving the information, formulating the gap at the designated location in a manner to be recognized by the garbage collector, the formulation of the gap causing the overlapping portion to be overwritten;

indicating, in the formulated gap, data that is structured to be interpretable by the garbage collector as relocation information with respect to the one or more adjacent non-pinned objects;

operating the garbage collector on the heap to relocate the one or more adjacent non-pinned objects according to the relocation information indicated in the formulated gap;

identifying whether the saved information comprises data from the one or more adjacent pinned objects or a data from the one or more adjacent non-pinned objects; and reconstituting the saved information back to a location on the heap according to whether the saved information includes data from the one or more adjacent pinned objects or from the one or more adjacent non-pinned objects, wherein when the saved information includes data from the one or more adjacent pinned objects, the data is reconstituted back to the original location on the heap associated with the one or more adjacent pinned objects, but when the saved information includes data from the one or more adjacent non-pinned objects, the data is reconstituted back to the heap according to the relocation of the one or more adjacent non-pinned objects.

15. The computer program product in accordance with claim 14, the boundary being a first found boundary, the designated location being a first designated location, the one or more adjacent pinned objects being a first set of one or more adjacent pinned objects, the one or more adjacent non-pinned objects being a first set of one or more adjacent non-pinned objects, the method further comprising:

finding a second boundary between a second set of one or more adjacent pinned objects and a second set of one or more adjacent non-pinned objects within the set of live objects;

identifying a second designated location for formulating a gap with respect to the second found boundary;

saving information that would be overwritten at the second designated location due to the anticipated formulation of the second gap;

after saving the information that would be overwritten at the second designated location, formulating the second gap in a manner to be recognized by the garbage collector at the second designated location; and indicating, in the formulated second gap, data that is structured to be interpretable by the garbage collector as relocation information with respect to either the second set of one or more adjacent pinned objects or the second set of one or more adjacent non-pinned objects.

16. The computer program product in accordance with claim 14, the set of live objects being a first set of live objects, the boundary being a first found boundary, the designated location being a first designated location, and the gap being a first gap, the method further comprising:

finding a second set of live objects within the heap;

finding a second boundary between one or more adjacent pinned objects and one or more adjacent non-pinned objects within the second set of live objects;

identifying a second designated location for formulating a gap with respect to the found second boundary in the second set of live objects;

saving information that would be overwritten at the second designated location due to the anticipated formulation of the second gap;

after saving the information that would be overwritten at the second designated location, formulating the second gap at the second designated location in a manner to be recognized by the garbage collector; and indicating, in the formulated second gap, data that is structured to be interpretable by the garbage collector as relocation information with respect to either the one or more adjacent pinned objects in the second set of live objects or the one or more adjacent non-pinned objects in the second set of live objects.

17. The computer program product in accordance with claim 14, the computer-executable instructions further structured such that the method further comprises the following at a later stage of the garbage collection:

scanning the heap for each of a plurality of gaps, and when each of at least some of the plurality of gaps including the formulated gap is found, performing the following:

identifying a corresponding set of one or more live objects of the same pinned status that the found gap corresponds to;

using relocation information within the found gap to relocate the corresponding set of one or more live objects;

finding a formulated gap within the corresponding set of one or more live objects that resulted in saved information being saved when the formulated gap was created; and reconstituting the corresponding set of one or more live objects of the formulated gap by recovering the saved information to a location on the heap that corresponds to where the one or more live objects were relocated.

18. A computer system for performing garbage collection on objects within a heap of a computing system, the computer system comprising:

one or more processors; and a garbage collector, operating at the one or more processors, configured to at least:

find a set of adjacent live objects within the heap, the set of adjacent live objects including at least:

one or more adjacent pinned objects that are pinned at an original location on the heap; and one or more adjacent non-pinned objects that are located at a different location on the heap and are not pinned to that different location on the heap;

find a boundary between the one or more adjacent pinned objects and the one or more adjacent non-pinned objects within the set of adjacent live objects;

identify a designated location for formulating a gap with respect to the found boundary, wherein the designated location for formulating the gap comprises an overlapping portion that overlaps at least a portion of either the one or more adjacent pinned objects or the one or more adjacent non-pinned objects;

save information stored in the overlapping portion that would be overwritten at the designated location due to the anticipated formulation of the gap;

after saving the information, formulate the gap at the designated location, the formulation of the gap causing the overlapping portion to be overwritten;

indicate, in the formulated gap, data that is structured to be interpretable by the garbage collector as relocation information with respect to the one or more adjacent non-pinned objects;

operate on the heap to relocate the one or more adjacent non-pinned objects according to the relocation information indicated in the formulated gap;

identifying whether the saved information comprises data from the one or more adjacent pinned objects or data from the one or more adjacent non-pinned objects; and reconstituting the saved information back to a location on the heap according to whether the saved information includes data from the one or more adjacent pinned objects or from the one or more adjacent non-pinned objects, wherein when the saved information includes data from the one or more adjacent pinned objects, the data is reconstituted back to the original location on the heap associated with the one or more adjacent pinned objects, but when the saved information includes data from the one or more adjacent non-pinned object, the data is reconstituted back to the heap to any non-occupied location.

19. The computer system of claim 18, wherein the garbage collector is further configured to:

scan the heap for each of a plurality of gaps that each contain relocation information for a corresponding set of one or more live objects of a same pinned status; and when, during the scanning, each of at least some of the plurality of gaps is found, perform the following:

identify a corresponding set of one or more live objects of the same pinned status that the found gap corresponds to;

use relocation information within the found gap to relocate the corresponding set of one or more live objects;

find a formulated gap within the corresponding set of one or more live objects that resulted in saved information being saved; and reconstitute the corresponding set of one or more live objects by recovering the saved information.

20. The computer system in accordance with claim 19, wherein the reconstituting occurs prior to the relocating the corresponding set of one or more live objects for at least one of the at least some of the plurality of gaps.

21. The computer system in accordance with claim 19, wherein the garbage collector is further configured to reformulate the formulated gap after the reconstituting.

22. The computer system in accordance with claim 19, wherein the garbage collector is further configured to reformulate the formulated gap after the relocating.

* * * * *